United States Patent
Takeshita

(10) Patent No.: US 10,216,457 B2
(45) Date of Patent: Feb. 26, 2019

(54) INFORMATION PROCESSING APPARATUS AND METHOD FOR PRESERVING DATA

(71) Applicant: FUJI XEROX CO., LTD., Tokyo (JP)

(72) Inventor: Atsushi Takeshita, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/812,404

(22) Filed: Jul. 29, 2015

(65) Prior Publication Data

US 2016/0216901 A1 Jul. 28, 2016

(30) Foreign Application Priority Data

Jan. 27, 2015 (JP) .................................. 2015-013762

(51) Int. Cl.
| | | |
|---|---|---|
| *G06F 3/06* | (2006.01) | |
| *G06F 12/14* | (2006.01) | |
| *G06F 9/4401* | (2018.01) | |
| *G06F 21/62* | (2013.01) | |

(52) U.S. Cl.
CPC ............ *G06F 3/0688* (2013.01); *G06F 3/062* (2013.01); *G06F 3/0644* (2013.01);
(Continued)

(58) Field of Classification Search
CPC ................................ G06F 12/14; G06F 3/0688
See application file for complete search history.

(56) References Cited

U.S. PATENT DOCUMENTS

| | | | |
|---|---|---|---|
| 6,941,219 B2 * | 9/2005 | Avery, Jr. ................ | F02D 41/22 701/115 |
| 7,103,718 B2 * | 9/2006 | Nickel ..................... | G11C 7/20 711/104 |

(Continued)

FOREIGN PATENT DOCUMENTS

| | | |
|---|---|---|
| JP | 10105504 A | 4/1998 |
| JP | 2005-301576 A | 10/2005 |

(Continued)

OTHER PUBLICATIONS

Communication dated Apr. 4, 2018 from the State Intellectual Property Office of the P.R.C. in counterpart Application No. 201510541754.2.

(Continued)

*Primary Examiner* — Charles Rones
*Assistant Examiner* — Tian-Pong Chang
(74) *Attorney, Agent, or Firm* — Sughrue Mion, PLLC

(57) ABSTRACT

An information processing apparatus includes a controller, a first storage unit, a second storage unit, and a classification unit. The controller stores pieces of information retained in a memory on a nonvolatile storage device and, upon startup, makes the information processing apparatus return to a state before power-down. The first storage unit is part of the nonvolatile storage device and stores some pieces of information among the pieces of information retained in the memory. The second storage unit is part of the nonvolatile storage device and stores pieces of information different from those stored on the first storage unit among the pieces of information retained in the memory. The classification unit classifies the pieces of information retained in the memory. The controller stores the pieces of information retained in the memory on the first storage unit or the second storage unit in accordance with classification performed by the classification unit.

22 Claims, 2 Drawing Sheets

(52) U.S. Cl.
CPC ............ *G06F 3/0679* (2013.01); *G06F 9/442* (2013.01); *G06F 9/4418* (2013.01); *G06F 12/14* (2013.01); *G06F 21/6209* (2013.01)

(56) References Cited

U.S. PATENT DOCUMENTS

| | | | | |
|---|---|---|---|---|
| 7,293,173 | B2* | 11/2007 | Field | G06F 12/126 |
| | | | | 711/E12.075 |
| 7,669,026 | B2* | 2/2010 | Boss | G06F 3/0605 |
| | | | | 711/165 |
| 7,869,453 | B2* | 1/2011 | Koo | G06F 13/28 |
| | | | | 370/428 |
| 8,316,102 | B2* | 11/2012 | Matsuzaki | G06F 11/1456 |
| | | | | 707/640 |
| 8,438,377 | B2 | 5/2013 | Senda | |
| 8,819,446 | B2* | 8/2014 | Boivie | G06F 21/125 |
| | | | | 713/189 |
| 8,904,126 | B2* | 12/2014 | Ashutosh | G06F 11/1451 |
| | | | | 711/161 |
| 9,086,971 | B2* | 7/2015 | Kobayashi | G06F 11/08 |
| 9,152,182 | B1* | 10/2015 | McMahon | G06F 1/1658 |
| 2005/0228982 | A1 | 10/2005 | Nakayama et al. | |
| 2009/0165081 | A1* | 6/2009 | Zhang | G06F 21/6218 |
| | | | | 726/1 |
| 2011/0225418 | A1* | 9/2011 | Shipley | G06F 21/74 |
| | | | | 713/153 |
| 2012/0110343 | A1* | 5/2012 | Bandic | G06F 21/80 |
| | | | | 713/189 |
| 2014/0032936 | A1 | 1/2014 | Akiba | |

FOREIGN PATENT DOCUMENTS

| | | |
|---|---|---|
| JP | 2010-267246 A | 11/2010 |
| JP | 2014026374 A | 2/2014 |

OTHER PUBLICATIONS

Communication dated Jun. 26, 2018, from the Japanese Patent Office in counterpart application No. 2015-013762.

Communication dated Oct. 19, 2018 from the State Intellectual Property Office of the P.R.C. in counterpart application No. 201510541754.2.

* cited by examiner

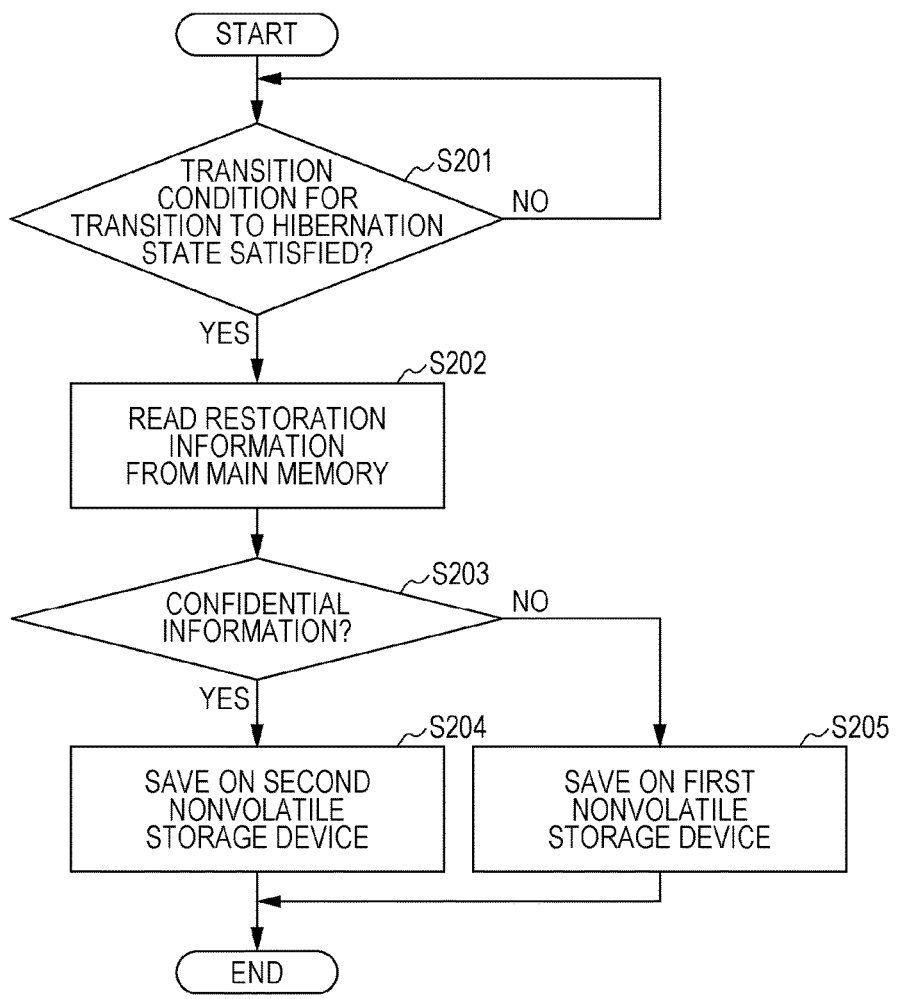

INFORMATION PROCESSING APPARATUS AND METHOD FOR PRESERVING DATA

CROSS-REFERENCE TO RELATED APPLICATIONS

This application is based on and claims priority under 35 USC 119 from Japanese Patent Application No. 2015-013762 filed Jan. 27, 2015.

BACKGROUND (i) Technical Field

The present invention relates to an information processing apparatus and a method for preserving data.

(ii) Related Art

Some information processing apparatuses have a function called hibernation. Hibernation is a function of saving, upon power-down of an information processing apparatus, information indicating the operation state of the information processing apparatus, such as a memory image, stored in the main memory, on a nonvolatile storage device, and restoring, upon next startup, the operation state of the information processing apparatus to the state before power-down by using the information saved on the nonvolatile storage device. A state where an information processing apparatus is powered down while using the hibernation function (state where information about the operation state of the information processing apparatus before power-down is saved so that, upon next startup, the operation state is restorable to the state before power-down) is called a hibernation state.

On an information processing apparatus that has transitioned to the hibernation state, information about the operation state of the information processing apparatus before power-down (hereinafter referred to as restoration information) is saved on a nonvolatile storage device. Accordingly, information processed by the information processing apparatus before power-down may be obtained from the restoration information saved on the nonvolatile storage device.

SUMMARY

According to an aspect of the invention, there is provided an information processing apparatus including a controller, a first storage unit, a second storage unit, and a classification unit. The controller stores pieces of information retained in a memory on a nonvolatile storage device and, upon startup, makes the information processing apparatus return to a state before power-down by using the pieces of information stored on the nonvolatile storage device. The first storage unit is part of the nonvolatile storage device and stores at least some pieces of information among the pieces of information retained in the memory. The second storage unit is part of the nonvolatile storage device and stores pieces of information different from the pieces of information stored on the first storage unit among the pieces of information retained in the memory. The classification unit classifies the pieces of information retained in the memory in accordance with a predetermined condition. In the information processing apparatus, the controller stores the pieces of information retained in the memory on the first storage unit or on the second storage unit in accordance with classification performed by the classification unit.

BRIEF DESCRIPTION OF THE DRAWINGS

An exemplary embodiment of the present invention will be described in detail based on the following figures, wherein:

FIG. 2 is a flowchart for describing operations of a classification unit and a save control unit.

DETAILED DESCRIPTION

Figure 1:
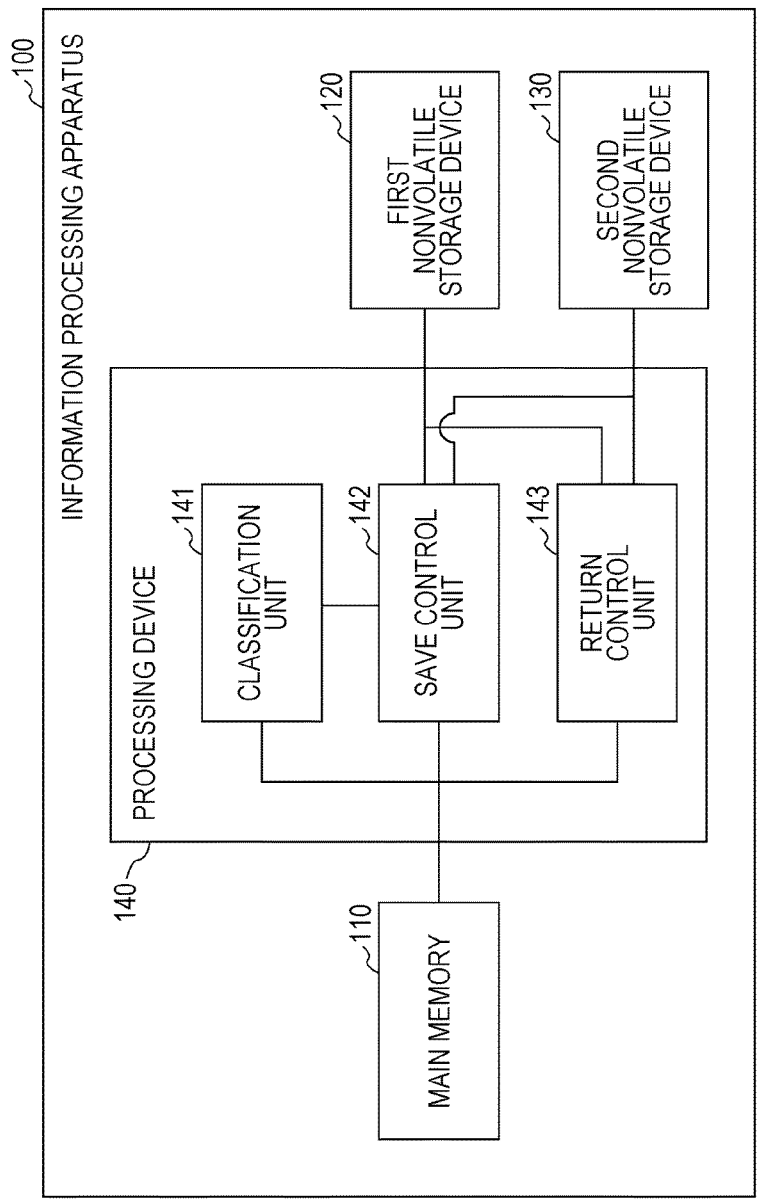
FIG. 1 is a diagram illustrating an example of an overall configuration of an information processing apparatus to which this exemplary embodiment is applied.

Hereinafter, an exemplary embodiment of the present invention will be described in detail with reference to the attached drawings.

System Configuration

FIG. 1 is a diagram illustrating an example of an overall configuration of an information processing apparatus to which this exemplary embodiment is applied.

The information processing apparatus according to this exemplary embodiment has a hibernation function (function of transitioning to a hibernation state) in a case of not being used for an extended period. This exemplary embodiment is applicable to personal computers, image forming apparatuses, such as printers and copying machines, and other various information processing apparatuses.

As illustrated in FIG. 1, an information processing apparatus 100 to which this exemplary embodiment is applied includes a main memory 110, a first nonvolatile storage device 120, and a second nonvolatile storage device 130 as memories. The information processing apparatus 100 further includes a processing device 140 as a controller. The processing device 140 is implemented as a central processing unit (CPU), for example, and executes a program loaded into the main memory 110 to thereby implement various functions. In this exemplary embodiment, the processing device 140 functions as a classification unit 141, a save control unit 142, and a return control unit 143. In this exemplary embodiment, when the information processing apparatus 100 transitions to the hibernation state, information retained in the main memory 110 is classified as a first type of information or a second type of information and is saved on the first nonvolatile storage device 120 or on the second nonvolatile storage device 130.

Note that FIG. 1 illustrates a configuration of the information processing apparatus 100 which only includes components for implementing this exemplary embodiment. Practically, various configurations other than that illustrated in FIG. 1 are conceivable depending on the type of information processing apparatus 100. In a case where the information processing apparatus 100 is a personal computer, for example, the information processing apparatus 100 includes an image display controller for displaying information, such as text and images, on a display device, an accepting unit for accepting input provided by using an input device, such as a keyboard or a mouse, and so on. In a case where the information processing apparatus 100 is an image forming apparatus, the information processing apparatus 100 includes an image forming engine for forming an image on a medium, such as a sheet, a convey mechanism for conveying a medium within the apparatus, and so on.

The main memory 110 is a volatile memory, and content stored therein is lost upon power-down. As the main memory 110, a random access memory (RAM) is used, for example. In the main memory 110, a program (process) executed by the processing device 140 is retained. The program is stored on an external storage device, such as a magnetic disk device, is copied from the external storage device to the main memory 110, and is executed by the processing device 140. The main memory 110 is also used as a work memory that retains data temporarily generated in the course of an arithmetic process performed by the processing device 140. Information, such as the program code and data, retained in the main memory 110 is preserved on a nonvolatile storage device as restoration information (hibernation image) when the information processing apparatus 100 transitions to the hibernation state.

The first nonvolatile storage device 120 is a storage device on which restoration information obtained from the main memory 110 is saved when the information processing apparatus 100 transitions to the hibernation state, and functions as a first storage unit. As the first nonvolatile storage device 120, a nonvolatile storage device, such as a magnetic disk device (hard disk drive (HDD)), a solid state drive (SSD), or a flash memory, is used, for example. The external storage device that stores the program may be used as the first nonvolatile storage device 120. As described below, restoration information saved on the first nonvolatile storage device 120 is information (hereinafter also referred to as general information) that is determined not to be highly confidential in this exemplary embodiment.

The second nonvolatile storage device 130 is a storage device on which restoration information obtained from the main memory 110 is saved when the information processing apparatus 100 transitions to the hibernation state, and functions as a second storage unit. As the second nonvolatile storage device 130, a nonvolatile storage device, such as a magnetic disk device (HDD), an SSD, or a flash memory, is used, for example. Unlike the first nonvolatile storage device 120, however, the second nonvolatile storage device 130 is provided with a protective unit for maintaining the confidentiality of information stored thereon. Specifically, as the second nonvolatile storage device 130, a nonvolatile storage device for which a measure for increasing security against unauthorized reading is taken, such as a storage device having an encryption function or a password locking function, or an on-board memory (memory directly mounted on a board), is used, for example. By using such a highly secure nonvolatile storage device as the second nonvolatile storage device 130, even if the second nonvolatile storage device 130 is removed without authorization, information stored on the removed second nonvolatile storage device 130 is not read in an unauthorized manner. If the second nonvolatile storage device 130 is an on-board memory, it is difficult to remove the on-board memory. As a matter of course, plural measures for increasing security may be combined and applied to a storage device that implements the second nonvolatile storage device 130. As described below, restoration information saved on the second nonvolatile storage device 130 is information (hereinafter referred to as confidential information) that is determined to be highly confidential in this exemplary embodiment.

The classification unit 141 obtains, when the information processing apparatus 100 transitions to the hibernation state, the program code and data that are used as restoration information from the main memory 110. The classification unit 141 classifies each piece of restoration information (program code and data) that has been obtained as restoration information to be saved on the first nonvolatile storage device 120 or restoration information to be saved on the second nonvolatile storage device 130. Here, the classification unit 141 saves restoration information that includes highly confidential data (confidential information) on the second nonvolatile storage device 130, and saves other restoration information (general information) on the first nonvolatile storage device 120. In other words, the classification unit 141 determines whether restoration information obtained from the main memory 110 is confidential information or general information.

The classification unit 141 determines whether data included in the restoration information obtained from the main memory 110 is highly confidential data by determining whether a process (execution program) for processing the data satisfies any of the specific conditions described below, for example:

(1) the process is locked to the memory;
(2) the process reads a file for which a protective measure is taken; and
(3) the process has a specific privilege relating to data protection.

The condition "the process is locked to the memory" described in (1) corresponds to a function of locking a page in virtual address space allocated to the process to a physical memory (main memory 110). This function is implemented by using a system call, such as "mlock", that is available in various operating systems (OSs), such as Linux (registered trademark), for example. Data written to the page that is locked to the physical memory is not moved from the physical memory. Accordingly, the data is assumed to be data of high importance, and the classification unit 141 determines the data to be highly confidential data in this exemplary embodiment. This determination is based on a condition attached to the process. It is possible to determine whether the process is locked to the memory by referring to a flag of a management structure of the process or of a page management structure, for example.

The condition "the process reads a file for which a protective measure is taken" described in (2) corresponds to a state where data loaded into the main memory 110 in the process is a file for which some protective measure is taken. Specifically, a file in a file system that is encrypted (encrypted file system), a file read from an encrypted memory device, a file protected by a specific policy of Security-Enhanced Linux (SELinux) used in Linux, and the like are files for which some protective measure is taken. In this exemplary embodiment, the classification unit 141 determines theses files for which a protective measure is taken as highly confidential data. This determination is based on a location where the file is stored before the file is loaded into the main memory 110. Note that the measures described above are merely examples of a protective measure. A file determined to be highly confidential data in this exemplary embodiment is not limited to a file for which any of the above-described specific measures is taken. It is possible to determine whether a protective measure is taken for a file by making an inquiry to a process management module of the information processing apparatus, for example.

In the condition "the process has a specific privilege relating to data protection" described in (3), "specific privilege" is a privilege based on Portable Operating System Interface for Unix (POSIX) capabilities, such as Linux kernel capabilities, for example. In this exemplary embodiment, the classification unit 141 determines data that is loaded into the main memory 110 in a process having such a specific privilege to be highly confidential data. This determination is based on a condition attached to the process. It is possible to determine whether the process has a specific privilege by referring to a flag of a management structure of the process or of a page management structure, for example.

In this exemplary embodiment, data that is loaded into the main memory 110 in a process that satisfies a specific condition as described above is determined to be highly confidential data, and restoration information (confidential information) that includes the highly confidential data is saved on the second nonvolatile storage device 130. Other restoration information (general information) is saved on the first nonvolatile storage device 120. Although examples of the specific condition are listed above, concrete conditions that are applied as the specific condition are not limited to the above-described examples.

The save control unit 142 reads the program code and data from the main memory 110 when the information processing apparatus 100 transitions to the hibernation state, and stores (preserves) the program code and data on a nonvolatile storage device as restoration information. In this exemplary embodiment, the save control unit 142 that functions as the controller saves restoration information that is obtained from the main memory 110 and that is confidential information on the second nonvolatile storage device 130 in accordance with classification performed by the classification unit 141. Further, the save control unit 142 saves restoration information that is obtained from the main memory 110 and that is not confidential information but general information on the first nonvolatile storage device 120.

The return control unit 143 reads, when the information processing apparatus 100 is started up from the hibernation state, restoration information saved on the first nonvolatile storage device 120 and on the second nonvolatile storage device 130, and writes the restoration information to the main memory 110. By the return control unit 143 functioning as the controller, the information processing apparatus 100 returns to the state before a transition to the hibernation state.

Operations of Classification Unit and Save Control Unit

FIG. 2 is a flowchart for describing operations of the classification unit 141 and the save control unit 142 (method for preserving data).

As illustrated in FIG. 2, if a transition condition for transition to the hibernation state is satisfied (Yes in step S201), the processing device 140 of the information processing apparatus 100 reads the program code and data retained in the main memory 110 as restoration information (step S202). Note that, as the transition condition for a transition to the hibernation state, a condition that is used as a transition condition in an existing hibernation technique, such as a condition that no operation is performed on the information processing apparatus 100 for a predetermined period, may be applied.

Next, the classification unit 141 of the processing device 140 determines whether the restoration information obtained in step S202 is confidential information (step S203). If the classification unit 141 determines that the restoration information is confidential information (Yes in step S203), the save control unit 142 of the processing device 140 saves the restoration information (confidential information) on the second nonvolatile storage device 130 (step S204). On the other hand, if the classification unit 141 determines that the restoration information is general information (No in step S203), the save control unit 142 saves the restoration information (general information) on the first nonvolatile storage device 120 (step S205).

Modification

Next, a modification of this exemplary embodiment will be described.

In the exemplary embodiment described above, the save control unit 142 saves restoration information that is determined by the classification unit 141 to be confidential information on the second nonvolatile storage device 130. Alternatively, the save control unit 142 may split confidential information and save part of the confidential information on the first nonvolatile storage device 120 and the remaining part of the confidential information on the second nonvolatile storage device 130.

In the case of splitting confidential information and saving part of the confidential information on the first nonvolatile storage device 120 and the remaining part of the confidential information on the second nonvolatile storage device 130, for at least the part of the confidential information that is to be saved on the first nonvolatile storage device 120, the save control unit 142 divides the part of the confidential information into sections so as to reduce information content and create an irreversible state. In doing so, it is not possible to restore the confidential information only from the part of the restoration information saved on the first nonvolatile storage device 120. As a result, the confidential information is kept confidential. Note that, for the part of the confidential information to be saved on the first nonvolatile storage device 120, a protective measure, such as encryption or access control using a password, may be taken before the part of the confidential information is stored on the first nonvolatile storage device 120.

Confidential information is split as described above in a case where the confidential information has a large amount of data that exceeds the storage capacity of the second nonvolatile storage device 130 or a predetermined threshold. Part of confidential information may be divided into sections so as to reduce information content and create an irreversible state regardless of the amount of data of the confidential information, the part of the confidential information that becomes irreversible may be saved on the first nonvolatile storage device 120, and the remaining part of the confidential information may be saved on the second nonvolatile storage device 130.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller configured to control storing pieces of information retained in a memory on a nonvolatile storage device and, upon startup, to make the information processing apparatus return to a state before power-down by using the pieces of information stored on the nonvolatile storage device;
a first storage unit that is part of the nonvolatile storage device and is configured to store at least some pieces of information among the pieces of information retained in the memory;
a second storage unit that is part of the nonvolatile storage device and is configured to store pieces of information different from the pieces of information stored on the first storage unit among the pieces of information retained in the memory; and a classification unit configured, in response to a request to power-down, to perform a classification in which the pieces of information retained in the memory are classified by identifying a process configured to process the pieces of information retained in the memory and subsequently determining whether the process satisfies a predetermined condition, the classification being different than the process, wherein the controller is further configured to control storing the pieces of information retained in the memory on the first storage unit or on the second storage unit in accordance with classification performed by the classification unit.

2. The information processing apparatus according to claim 1, wherein the classification unit is further configured to classify each piece of information among the pieces of information retained in the memory as confidential information or general information in accordance with the predetermined condition, and the controller is further configured to control storing the general information on the first storage unit and to control storing the confidential information on the second storage unit.

3. The information processing apparatus according to claim 2, wherein the classification unit is further configured to classify each piece of information among the pieces of information retained in the memory as confidential information or general information in accordance with a condition attached to an execution program for processing the piece of information.

4. The information processing apparatus according to claim 2, wherein the classification unit is further configured to determine a piece of information among the pieces of information retained in the memory to be confidential information in a case where the piece of information is information obtained by reading a file for which a protective measure is taken.

5. The information processing apparatus according to claim 3, wherein the classification unit is further configured to determine a piece of information among the pieces of information retained in the memory to be confidential information in a case where the piece of information is information obtained by reading a file for which a protective measure is taken.

6. The information processing apparatus according to claim 1, wherein the classification unit is further configured to classify each piece of information among the pieces of information retained in the memory as confidential information or general information in accordance with the predetermined condition, and the controller is further configured to divide the confidential information into a plurality of sections, to control storing some of the sections of the confidential information and the general information on the first storage unit, and to control storing remaining sections of the confidential information on the second storage unit.

7. The information processing apparatus according to claim 1, wherein the second storage unit is a storage device for which a protective measure for protecting stored information is taken.

8. The information processing apparatus according to claim 2, wherein the second storage unit is a storage device for which a protective measure for protecting stored information is taken.

9. The information processing apparatus according to claim 6, wherein the second storage unit is a storage device for which a protective measure for protecting stored information is taken.

10. The information processing apparatus according to claim 1, wherein the predetermined condition comprises storing the pieces of information in the second storage unit in response to determining that a page in a virtual address space allocated to the process is locked to a physical memory.

11. The information processing apparatus according to claim 1, wherein the predetermined condition comprises storing the pieces of information in the second storage unit in response to determining that the process is configured to read an encrypted file.

12. The information processing apparatus according to claim 1, wherein the predetermined condition comprises storing the pieces of information in the second storage unit in response to determining that the process is configured to read a file protected by a Security-Enhanced Linux (SELinux) policy.

13. The information processing apparatus according to claim 1, wherein the predetermined condition comprises storing the pieces of information in the second storage unit in response to determining that the process comprises Portable Operating System Interface for Unix (POSIX) capabilities.

14. The information processing apparatus according to claim 1, wherein the second storage unit is encrypted.

15. The information processing apparatus according to claim 1, wherein the process is an execution program configured to process the pieces of information retained in the memory.

16. The information processing apparatus according to claim 1, wherein the controller is configured to control storing the pieces of information retained on the memory such that the pieces of information retained on the memory are split from each other into an irreversible state such that information of the pieces of information may not be restored without each of the pieces of information split by the controller.

17. The information processing apparatus according to claim 16, the controller is further configured to control splitting the pieces of information from each other in response to determining whether the process satisfies the predetermined condition.

18. The information processing apparatus according to claim 1, wherein the classification unit is further configured to determine whether the process satisfies the predetermined condition by determining whether a first flag of a management structure of the process exists, by determining a storage location of the pieces of information and by determining whether a second flag of the management structure of the process exists.

19. The information processing apparatus according to claim 1, wherein the controller is further configured, in response to the startup, to transfer the pieces of information from the first storage unit and the second storage unit to another memory.

20. The information processing apparatus according to claim 1, wherein determining whether the process satisfies the predetermined condition comprises checking the process alone.

21. An information processing apparatus comprising:
a first nonvolatile storage device;
a second nonvolatile storage device different from the first nonvolatile storage device; and
a processing device configured to control storing, among pieces of information retained in a memory, a piece of information that is determined, by performing, in response to a request to power-down, a classification in which the pieces of information are classified by identifying a process configured to process the pieces of information retained in the memory and subsequently determining whether the process satisfies a predetermined condition, to be confidential information on the second nonvolatile storage device, and to control storing a piece of information that is determined not to be confidential information but to be general information on the first nonvolatile storage device,
wherein the classification is different than the process.

22. A method for preserving data, the method comprising:
performing a classification, in response to a request to power-down, in which information retained in a memory is classified as a first type of information or a second type of information different from the first type of information by identifying a process configured to process the information retained in the memory and subsequently determining whether the process satisfies a predetermined condition, the classification being different than the process;
saving the first type of information on a first nonvolatile storage device in accordance with classification of the information; and
saving the second type of information on a second nonvolatile storage device provided separately from the first nonvolatile storage device, in accordance with classification of the information.

* * * * *